(No Model.)
J. THOMAS.
HORSE COLLAR FASTENER.
No. 425,836. Patented Apr. 15, 1890.
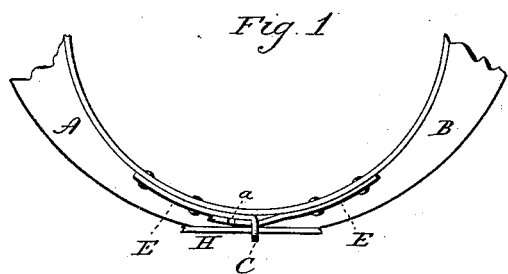
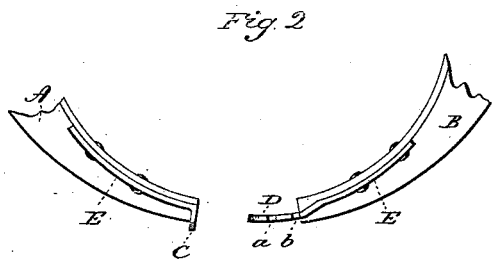
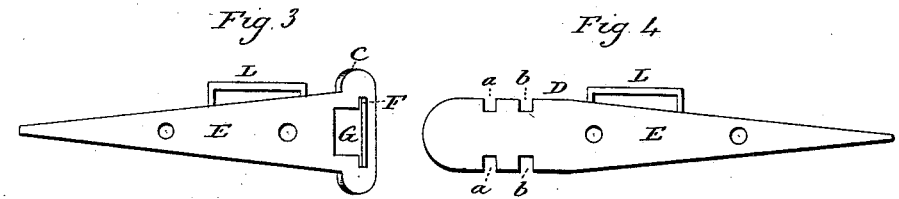
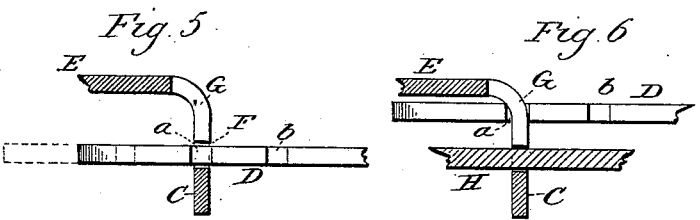
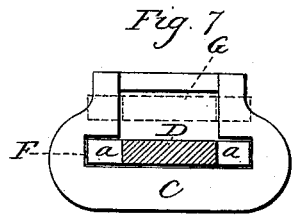
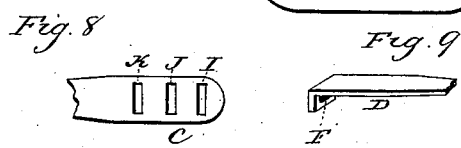
Witnesses.
John Thomas
Inventor,
By Attys.
Earle & Seymour

UNITED STATES PATENT OFFICE.

JOHN THOMAS, OF CEDAR RAPIDS, IOWA.

HORSE-COLLAR FASTENER.

SPECIFICATION forming part of Letters Patent No. 425,836, dated April 15, 1890.

Application filed December 2, 1889. Serial No. 332,281. (No model.)

*To all whom it may concern:*

Be it known that I, JOHN THOMAS, of Cedar Rapids, in the county of Linn and State of Iowa, have invented a new Improvement in Adjustable Horse-Collar Fastenings; and I do hereby declare the following, when taken in connection with accompanying drawings and the letters of reference marked thereon, to be a full, clear, and exact description of the same, and which said drawings constitute part of this specification, and represent, in—

Figure 1, a front view of the lower portion of a divided horse-collar, the two ends connected by my improved fastener; Fig. 2, the same as Fig. 1, the two parts separated; Fig. 3, a top view of the eye-piece enlarged; Fig. 4, a top view of the hook-piece enlarged; Figs. 5 and 6, longitudinal sections illustrating the introduction of the hook-piece into engagement with the eye-piece enlarged; Fig. 7, a face view of the eye-piece enlarged, and Figs. 8 and 9 modifications.

This invention relates to an improvement in devices for connecting the ends of the divided collar under the neck of the horse. Collars divided under the neck are a common expedient, and such collars have been provided with locking devices upon the meeting ends, by which those two ends might be secured.

In the use of horse-collars it frequently occurs that the same collar is required to be used for different horses, and as the necks of some horses are much thicker than the necks of other horses it follows that a collar adapted to fit a horse with a thick neck would not properly fit a horse having a thin neck.

The object of my invention is to construct a fastening device for the meeting ends of the collar, so that while they may be firmly engaged they may be adjusted so as to expand or contract the width of the collar as occasion may require, so that the collar may be adapted to horses having necks of different thicknesses; and the invention consists in the construction as hereinafter described, and particularly recited in the claim.

A represents one side of a collar, and B the opposite side.

C represents what may be called an "eye-piece," and D what may be called the "hook-piece," the two pieces being constructed with a shank E, by which they may be attached to their respective parts, and so that the hook on the one part is adapted to engage the eye on the other part.

In the best construction the hook is provided with notches *a b* on each edge, there being two or more of these notches on each edge. The eye-piece C is turned down at substantially right angles to its shank E, and constructed with an opening F, forming a loop, the width of this opening corresponding to the width of the hook-piece D, and so that the hook-piece may be inserted through the loop F. Above the loop F the opening is contracted, as at G, (see Figs. 3 and 7,) to a width corresponding to the width of the hook-piece between opposite notches, the width of the notches themselves corresponding substantially to the thickness of the eye-piece, and so that the hook-piece D, being inserted into the eye-piece C, as seen in Fig. 5, until opposite notches come into the plane of the contracted opening G above, then the hook-piece is raised, carrying the notches corresponding thereto onto the two sides of the opening G, as seen in Fig. 6, and as also indicated in broken lines, Fig. 7. Thus the hook-piece is interlocked with the eye-piece. The opening F forms a loop into which the hame-strap may be tucked, as seen in Figs. 1 and 6, H indicating the hame-strap. This strap fills the loop F, and consequently prevents the return of the hook into the loop F. Thus after the collar is applied and the strap introduced the collar is firmly locked.

The engagement between the eye and hook piece may be made with either of the pairs of notches on the hook; consequently the fastening device is adjustable according to the number of notches in the eye-piece, by which engagement may be made; hence the collar may be expanded or contracted according to circumstances.

I have mentioned the hame-strap H as introduced into the loop F to hold the parts in engagement; but this may be an independent strap, if preferred.

Instead of making the hook-piece with several points of engagement, the eye-piece may be made in the form of several loops, as I, J, and K, Fig. 8, succeeding each other, and the hook-piece may be made in the form of a hook, as seen in Fig. 9, its end turned downward and adapted to pass through either of the loops I J K, the turned-down end being provided with a loop, as F, through which the strap may be tucked, as before. In this case the adjustment is made in substantially the same manner as first described. While, therefore, preferring the notched hook-piece and the eye with the loop and the contracted opening therefrom, I do not wish to be understood as limiting the invention to that particular construction. Each part is provided with a loop L (see Figs. 3 and 4) as a convenience for attaching the pole-straps; but these may be omitted, if desired.

It will be understood from the foregoing that I do not claim, broadly, a divided collar provided with means for securing the two ends of the collar; but What I do claim is—

The combination of the eye-piece C, constructed with a shank by which it may be secured to the collar, the said eye-piece being in a plane at substantially right angles to the plane of the shank, and the eye-piece constructed with a loop F, having a contracted opening G therefrom, the hook-piece D, in width corresponding to the length of said loop F, and the hook-piece constructed with several notches on the edge, each notch adapted to permit the hook-piece to pass into the contracted opening from the loop, and the said loop adapted for the insertion of a strap after the hook-piece has passed into the said contracted opening, substantially as described.

JOHN THOMAS.

Witnesses:
FRANK A. THOMAS,
RICHARD ALMY.